(12) United States Patent
Macleod et al.

(10) Patent No.: US 9,401,771 B2
(45) Date of Patent: *Jul. 26, 2016

(54) SYSTEMS AND METHODS FOR DELIVERING CONTEXTUALLY RELEVANT MEDIA CONTENT STREAM BASED ON LISTENER PREFERENCE

(71) Applicant: Rivet Radio, Inc., Chicago, IL (US)

(72) Inventors: John Macleod, Kenilworth, IL (US); Cynthia Paulauskas, Chicago, IL (US); Narayanan Alwar, South Barrington, IL (US); Vivekanandan Sundararaman, Aurora, IL (US); Thomas Stat, Northbrook, IL (US); Boris Geissler, Chicago, IL (US); April Anne Starr, Riverside, IL (US); Charles Meyerson, Oak Park, IL (US)

(73) Assignee: Rivet Radio, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,066

(22) Filed: Dec. 8, 2014

(65) Prior Publication Data

US 2015/0162999 A1  Jun. 11, 2015

Related U.S. Application Data

(60) Provisional application No. 61/913,229, filed on Dec. 6, 2013, provisional application No. 61/913,231, filed on Dec. 6, 2013, provisional application No. 61/913,239, filed on Dec. 6, 2013, provisional application No. 61/936,264, filed on Feb. 5, 2014, provisional application No. 61/915,504, filed on Dec. 12, 2013, provisional application No. 61/915,507, filed on Dec. 12, 2013, provisional application No. 61/936,251, filed on Feb. 5, 2014.

(51) Int. Cl.
*H04H 60/35* (2008.01)
*H04H 60/46* (2008.01)
*H04H 60/51* (2008.01)
*H04W 4/02* (2009.01)
*H04W 4/06* (2009.01)

(52) U.S. Cl.
CPC ............... *H04H 60/46* (2013.01); *H04H 60/51* (2013.01); *H04W 4/025* (2013.01); *H04W 4/06* (2013.01)

(58) Field of Classification Search
CPC ............................... H04H 60/35; H04W 4/06
USPC ................ 455/3.01, 3.03, 3.06, 456.1, 456.3, 455/456.6, 414.1
See application file for complete search history.

(56) References Cited

U.S. PATENT DOCUMENTS

| | | | | |
|---|---|---|---|---|
| 2005/0193015 A1* | 9/2005 | Logston | ............ | G06F 17/30058 |
| 2013/0311287 A1* | 11/2013 | Jacobson | ............ | G06Q 30/0256 705/14.54 |
| 2014/0059595 A1* | 2/2014 | Jacobson | ............. | H04N 9/8205 725/34 |

* cited by examiner

Primary Examiner — John J Lee
(74) Attorney, Agent, or Firm — Richards Patent Law P.C.

(57) ABSTRACT

The present disclosure provides a system for delivering contextually relevant streaming media content embodied in a mobile device, wherein the media stream includes one or more media content segments content selected from a plurality of media content segments content based on the current location of the mobile device and received listener preferences.

11 Claims, 7 Drawing Sheets

SYSTEMS AND METHODS FOR DELIVERING CONTEXTUALLY RELEVANT MEDIA CONTENT STREAM BASED ON LISTENER PREFERENCE

CROSS-REFERENCE TO RELATED APPLICATIONS

This application incorporates by reference and claims the benefit of priority to U.S. Provisional Application No. 61/913,229 filed on Dec. 6, 2013, U.S. Provisional Application No. 61/913,231 filed on Dec. 6, 2013, U.S. Provisional Application No. 61/913,239 filed on Dec. 6, 2013, U.S. Provisional Application No. 61/936,264 filed on Feb. 5, 2014, U.S. Provisional Application No. 61/915,507 filed on Dec. 12, 2013, U.S. Provisional Application No. 61/915,504 filed on Dec. 12, 2013, and U.S. Provisional Application No. 61/936,251 filed on Feb. 5, 2014.

BACKGROUND OF THE INVENTION

Traditional radio stations broadcast a single broadcast stream providing identical content to everyone listening to the radio, regardless of its relevance to the individual listeners. This "one size fits all" approach delivers the same information to everyone listening, irrespective of his or her interest, needs, or location. Moreover, broadcast radio is unable to determine when individual listeners tune in and tune out. As a result, the conventional broadcast repeats a shallow depth of generic information in an attempt to deliver all of the information to all of the listeners. While such generic content may be the best compromise to broadcasting to a large group of people, individual listeners may be interested in only a portion of the general content that is relevant to their location, neighborhood, interests, and lifestyle.

Lack of personalization is a problem with all types of broadcast media, but it is particularly relevant to news radio. In news radio, information that is specific to one geographic area may be completely irrelevant to people listening in other geographic areas. Yet, radio stations in large metro areas cover hundreds of miles and report the same content to each of the different regions contained within the metro area. For example, a listener may become disinterested or even frustrated when listening to long traffic reports for areas in which she is not driving, sports updates for teams she does not follow, or events in neighborhoods she does not live or visit. In response, a listener must switch to different radio stations to find the information she likes or to avoid listening to information in which she has no interest.

Using traffic information as an example to illustrate the problems with generic broadcasts, in many regions, consumers rely heavily on the traffic information provided by radio stations to determine their expected time of arrival to their destination. Consumers also use the traffic information in order to decide if they should take an alternate route to reach their destination in light of the reported traffic or automobile accident. Accordingly, timeliness and relevancy of traffic information is important to these listeners. However, traditional radio stations provide general traffic information to cover the entire broadcast region and typically only report the traffic on a predetermined schedule, e.g., once every ten minutes. As a result, the listeners at one end of the city are provided the same information as those listeners at the other and the length of the traffic report is necessarily extended to provide comprehensive information. This is not an ideal solution for each listener (or really for any listener). Although traffic news is the example used, these problems are typical for any media broadcast.

Further to that point, media content is often time-sensitive. As examples, weather reports and traffic reports are often only valid for a short window of time before they become irrelevant. In addition, there are important times to receive weather and traffic reports, such as when preparing to leave the house. However, because traditional media content is broadcast and consumed in real-time, media content both may become stale and may not be delivered at the opportune moment. For example, a listener may leave the house, get into the car, and turn on the radio. If the listener has just missed the traffic report, he or she may need to wait another 10 minutes (or more) before the traffic report is repeated. By that time, the listener may have already gotten deep enough into the commute that the report will no longer be as useful because the listener is either at his or her destination or in the midst of the traffic.

A further problem with conventional media broadcasts, particularly radio news and talk shows is that certain media stories will be broadcast without regard to age-sensitive material. For example, the news may include topics related to a murder case or a bank robbery, sexual assault, marijuana being legal, poverty in Africa, or a devastation of a tsunami in Japan. However, such material may be inappropriate for children, or other sensitive listeners, to hear. When a listener is confronted with inappropriate content while listening with sensitive listeners (for example, a parent driving a car with young children), the listener must turn off the radio or hastily switch to a different station to avoid the content. The inability for traditional media broadcasts to enable a user to personally choose how to filter inappropriate content is a problem.

In summary, the problems with broadcast media include an overload of generalized information, providing information that is not relevant to the listeners based on the listener's preferences and/or location, and providing information that is not delivered at an optimal time, and a lack of filtering of broadcast media.

SUMMARY OF THE INVENTION

To meet the needs described above and others, the present disclosure provides a system for delivering contextually relevant streaming media content wherein the selection of the audio content is customized to the user based on the listener's preferences and/or location. In doing so, the system provides a unique media stream to each listener composed of media content segments chosen by the system and delivered in a continuous media stream. For example, each media content segment may be stored in a database and associated with various tags, such as preference tags, location tags, time tags, etc., such that only media content that correspond to a specific user's preferences and/or location are delivered to the specific listener. The primary examples used throughout this description are related to streaming radio media content, particularly streaming radio media content delivered via Internet radio to a mobile application embodied in a mobile device. However, it is understood that the inventions taught herein are applicable in a wide range of content stream delivery systems, including various audio and visual media and various audio and visual media playback systems and devices.

In an embodiment, the system is embodied in an audio content platform including a media server in communication with a mobile device through the Internet. The media server may include a controller, memory, and database. The controller may communicate with a mobile device (such as a mobile device or vehicle dashboard computer) or an application running on the mobile device (such as a mobile application, or vehicle dashboard computer application) to play a media content segment, which may be an individual media content segment or a consecutive stream of a plurality of media content segments. The media server may customize a contextually relevant media stream to the mobile device based on the local time, the listener's location, habits, and preferences, demographics, and other personal and demographic information of the listener associated with the mobile device.

For example, when in use by a listener, the controller, via a location service subsystem, may determine a region that the mobile device is currently located, and deliver a relevant media content segment based on the received current location of the listener. For example, the listeners in New York area will hear New York news, sports, and traffic information, and not hear local Chicago stories. In another example, the media server may assemble an individualized stream of media based on user preferences, a user's current location, and further based on the current time. For example, a user may want to hear sports from LA because that is where the listener grew up, but wants to hear weather and traffic in Chicago because that is the listener's current location, and he wants to hear financial news from NY because his business is based in NY. In another example, the listener's current location, such as driving past a landmark, may trigger a traffic report delivery pertaining to the area surrounding the landmark. The customized media stream may also be based on the current time, such that only media that has not expired is delivered to the listener.

For example, each media content segment may be associated with a content category. Each content category may comprise various sub-categories representing more particular information about each media content segment. A particular media content segment may be associated with one or more categories and sub-categories.

Listener's preferences may include various general topics or categories and sub-categories. Listener preferences may also include specific topics (e.g., comic books) the listener may submit and/or audio programs that they like to follow (e.g., specific podcasts or radio programs). In addition, listeners may allow the system to associate the listener preferences with a social networking account, such that the system is configured to access the social network account of the listener to automatically determine topics and/or categories of content that the listener would be interested in based on the information within the social network. The people, places, and things with which the user associates through social media may be the basis for automatically assigning specific and generalized preferences. For example, the system receives information that a user "Likes" the Chicago Bulls on Facebook and associates the user's preferences with the Chicago Bulls, specifically, and NBA basketball, generally. While this is an example of a simple association, it is contemplated that more complex associations and preferences may be determined by assessing associations across a greater number of dimensions (e.g., assessing associations with various entertainment categories and news preference may prompt a preference assignment of a specific retailer or retail category).

In addition, the listener preference may include a selection of a "safe mode" such that the system filters the audio stories and delivers only kid-friendly subject matter. From another perspective, the listener preference could be a combination of factors that indicate when "safe mode" may be exited or, even more directly, a listener preference may indicate specific times or locations in which media that would be otherwise be filtered out by a "safe mode" should proactively be delivered.

For example, a user may be able to indicate within the system via user preferences a known range of times and/or locations in which the user will be known to be alone in his or her vehicle and the system may intentionally deliver media content segments that would at other times and locations be filtered by a safe mode.

In an example of delivering contextually relevant streaming media content based on user preferences, the system may determine the current time and create a contextually relevant media stream based on the listener's time and content preferences. For example, if a listener has indicated a preference for weather news in the morning, the system may deliver to the listening device media content segments related to the weather at the beginning of the day but suppress such content when the user listens to content in the afternoon. In addition to delivering media content segments based on the listener's stated preferences, the system may deliver media content segments based on the listener's past listening/viewing behavior, the user's current location, among others.

Similarly, contextually relevant streaming media content may be delivered based on location. Each media content segment may also be associated to regions where the media content segment is relevant. These regions can vary from global, national, local, to hyper local regions within a metro area. Each region may be composed of smaller regions. For example, a state region may be composed of multiple sub-regions represent various local areas and cities. Likewise, a metropolitan area may be composed of neighborhood or sub-division sub-regions.

Regions may be organized based on local knowledge and the relevancy of different content type. Regions may be comprised of sub-regions that are disjointed, i.e., not overlapping. In one example, a region may be composed of a plurality of geographies that are non-contiguous yet all a part of a single region. In another example, sub-regions related to school districts may be separated at the boundaries of the districts and therefore not overlap. Regions may also be comprised of sub-regions that do overlap. For example, sub-regions related to the popularity of various local sports teams may overlap. Content types may have associated regional representations that reflect the variation in interest in the content from place-to-place.

In one example of location-based contextually relevant streaming media content, the present invention solves the above mentioned problems by delivering traffic reports that are relevant to listeners based on their current geographic location. The media content segment presented to the listener at a given time pertains to the region the listener is currently located and/or the listener's path of travel. In other words, in an example, the present system ensures that the traffic report is customized to the listener based on the listener's location.

Specifically, the present system provides traffic information that is relevant to the listeners and eliminates the cluttered broadcast to which they have traditionally been subjected. In addition, the system provides the relevant traffic information as soon as it is made available. Further, the system may provide traffic information as an aerial view traffic report to deliver a more detailed traffic report for the key roads and public transport around the listener's destinations.

The present system delivers the traffic information as part of the audio news platform, wherein the information is relevant and timely. When new traffic reports become available for the region pertaining to the listener, the information is immediately presented to the listener as the next audio report, so that the relevancy of the report is maintained.

In an embodiment, the disclosure provides a system for delivering contextually relevant streaming media content embodied in a mobile device comprising a controller, a user input-output subsystem, a communication subsystem, a location subsystem controlled by the controller, a media output subsystem controlled by the controller, and a memory coupled to the controller. The memory is configured to store program instructions executable by the controller, wherein in response to executing the program instructions, the controller is configured to receive, via the user input-output subsystem, a user command corresponding to at least one listener preference. The controller is also configured to receive, via the location subsystem, a current location of the mobile device, and provide, via the communication subsystem, the current location of the mobile device to the media server. In response to providing the current location of the mobile device to the media server, receive, via the communication subsystem, a contextually relevant media stream, wherein the contextually relevant media stream includes one or more media content segments selected from a plurality of media content segments based on the current location of the mobile device and the at least one listener preference.

The selected media content segment may include traffic information, regional specific news, regional sports news, and/or regional weather news.

The selection of the media content segment may be further based on a temporal relevance tag associated with the media content segment, wherein the temporal relevance tag indicates an expiration time associated with the selected media content segment.

The at least one user preference may include a content selection associated with traffic media content, news media content, sports media content, and/or weather media content.

In an example, the listener preference includes at least one content selection, wherein the plurality of media content segments are stored in a database, wherein the database includes a location tag and a content tag associated with each of the plurality of media content segments. The contextually relevant media stream may include one or more media content segments associated with the location tag that matches the current location of the mobile device, wherein the contextually relevant media stream includes one or more media content segments associated with the content tag that matches the at least one content selection.

In another example, the at least one listener preference may includes a content selection and a time selection, wherein the controller is configured to deliver the contextually relevant media stream at a time that matches the time selection, wherein the contextually relevant media stream includes one or more media content segments associated with the content tag that matches the at least one content selection.

An advantage of the current system is providing listeners with the information that is customized to the listener's preferences and location, thereby avoiding the presentation of unnecessary and irrelevant information.

Another advantage of the invention is to allow advertisers to be reassured listeners will not skip out of stories because they are deemed as clutter: the stories and content the listeners hears will be exactly the ones he or she wants.

Another object of the invention is to associate different types of content to different time periods chosen by the listener so that the listener is not constrained by the traditional "one size fits all" streams of audio stories and news.

Another object of the invention is to associate different types of content to different regions so that listeners are not constrained by the traditional geo-fencing models.

An object of this invention is to ensure that listeners are provided with up-to-date, relevant content and not presented with stale, expired content.

An advantage of the audio content created is that it is customized for the listener. For example, traffic reports delivered are based on the region of the listeners, and/or a specific commute route, either inbound or outbound. In other words, different types of traffic reports are delivered to listeners in different regions.

In addition, the shelf life of the traffic report is set based on the relevance and type of traffic report (e.g. based on variations in traffic times, reports are created dynamically, as opposed to a conventional traffic report once every 10 minutes). In addition, the traffic report may always be made available to the listener irrespective of the time at which they start listening (i.e., no need to wait for a specific time to listen to traffic report).

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

The present disclosure provides systems and methods for delivering contextually relevant streaming media content.

Figure 1:
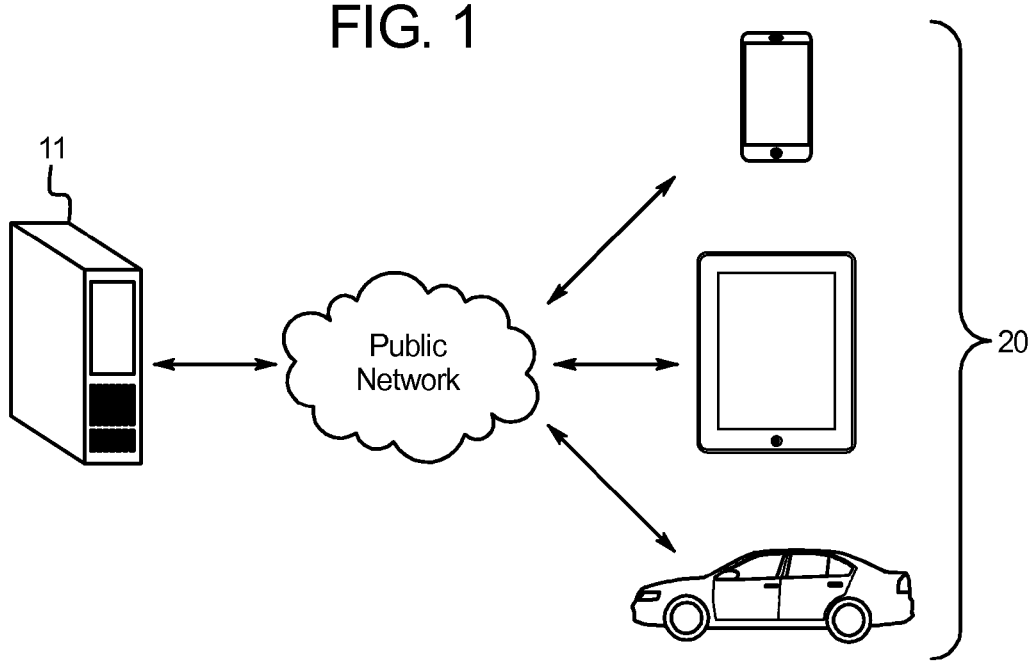
FIG. 1 is a schematic representation of a system for delivering contextually relevant streaming media content.

The present disclosure provides a system 10 wherein the selection of the media content is customized to the listener based on the listener's preferences and/or location. As shown in FIG. 1, the system 10 includes a media server 11 in communication with a mobile device 20.

Figure 2:
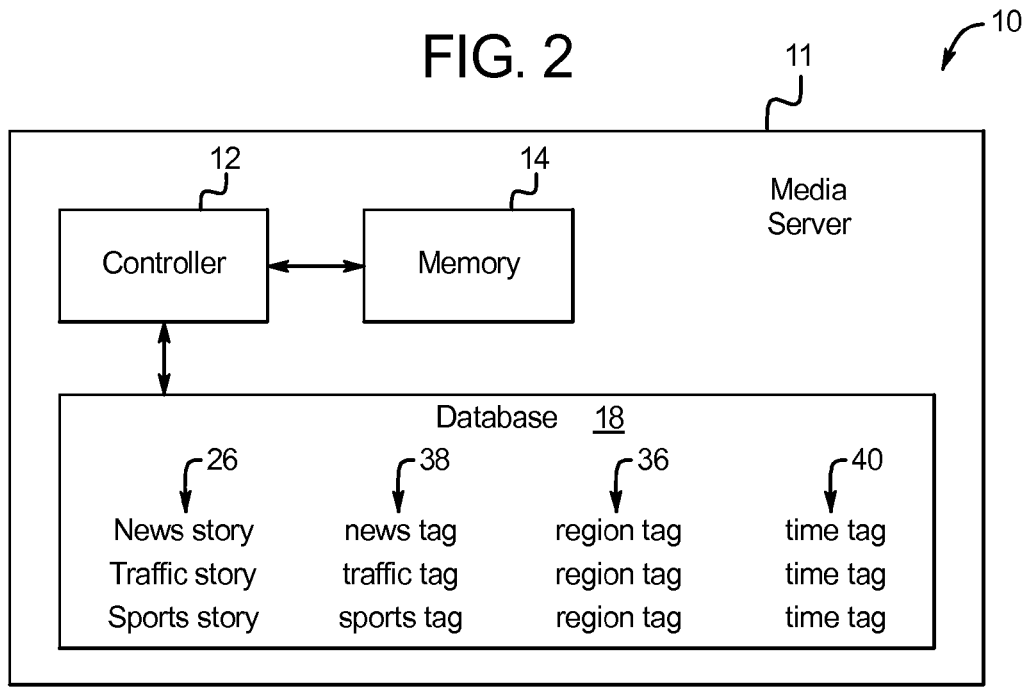
FIG. 2 is a schematic representation of a media server in the system shown in FIG. 1.

The media server 11 is configured to create and deliver media content segments 26 that correspond to a specific listener's preferences and/or location. The media server, as shown in FIG. 2, includes a controller 12 in communication with both a memory 14 and a database 18. The memory 14 is configured to store program instructions executable by the controller 12.

The database 18 may include a plurality of media content segments 26, wherein each media content segment 26 is associated with various tags, as described further herein. The media content segments 26 may be original content, licensed content, user content, etc. In use, the media content segments 26 are assembled together into a contextually relevant media stream 28 that is delivered to a mobile device 20, as described further herein.

The media server 11, via the controller 12, may communicate with the mobile device 20 (such as a mobile phone, tablet computer, portable media receiver, in-vehicle media receiver, vehicle dashboard computer, etc.) or an application running on the mobile device 20 (such as a mobile application, or vehicle dashboard computer application) to play a contextually relevant media stream 28. The contextually relevant media stream 28 may be based on the local time, the listener's location, habits, and preferences, demographics, and other personal and demographic information of the listener associated with the mobile device 20. As such, each listener may be provided with a unique contextually relevant media stream 28, though it is understood that depending on the degree of customization and the scope of media content segments 26 available, not each contextually relevant media stream 28 will be unique.

Figure 3:
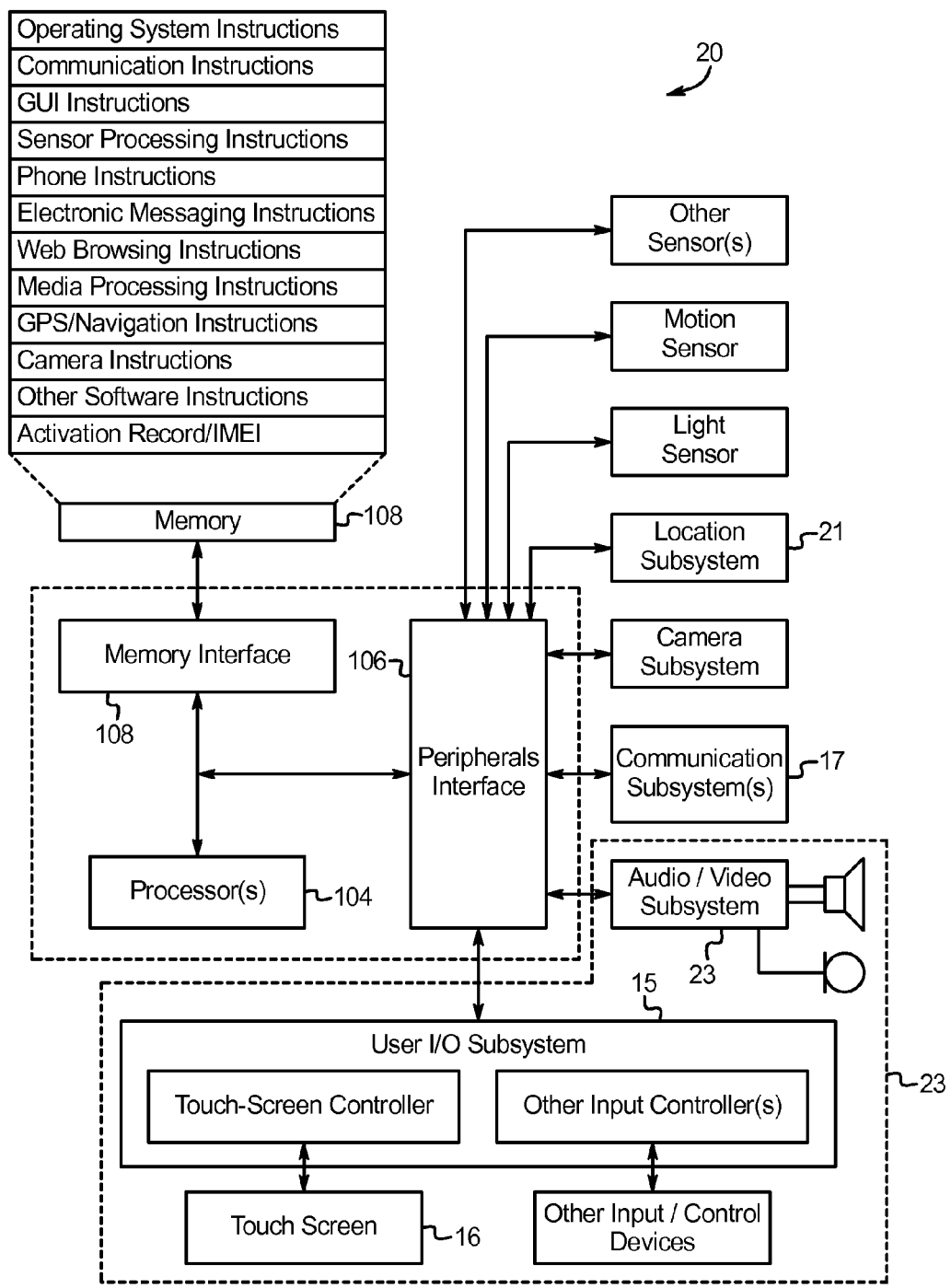
FIG. 3 is a schematic representation of a mobile device in the system shown in FIG. 1.
Figure 4A:
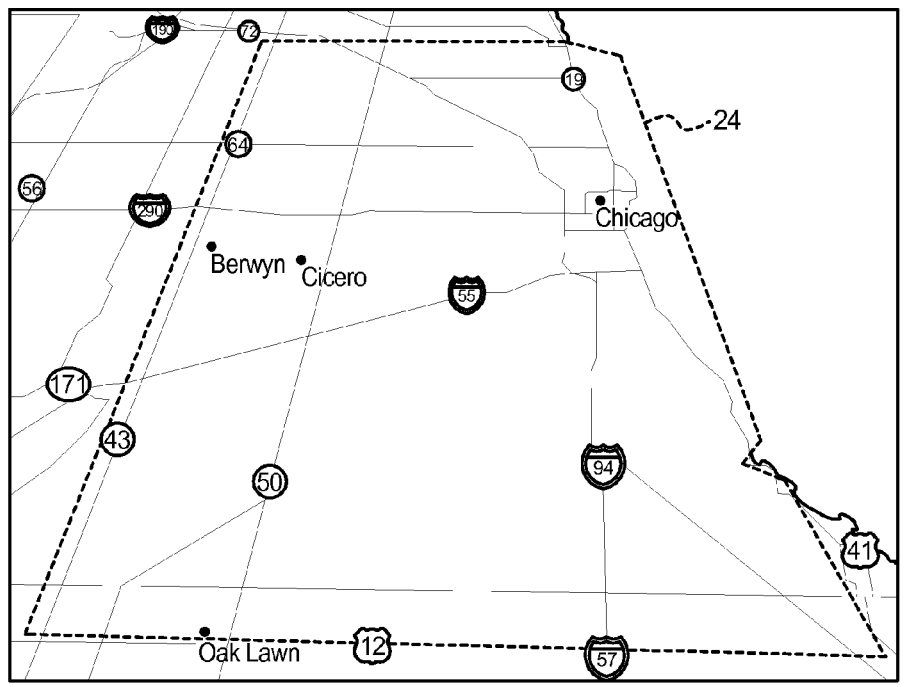
FIGS. 4A-4E are graphical top views of examples of various regions of geographical areas.
Figure 4B:
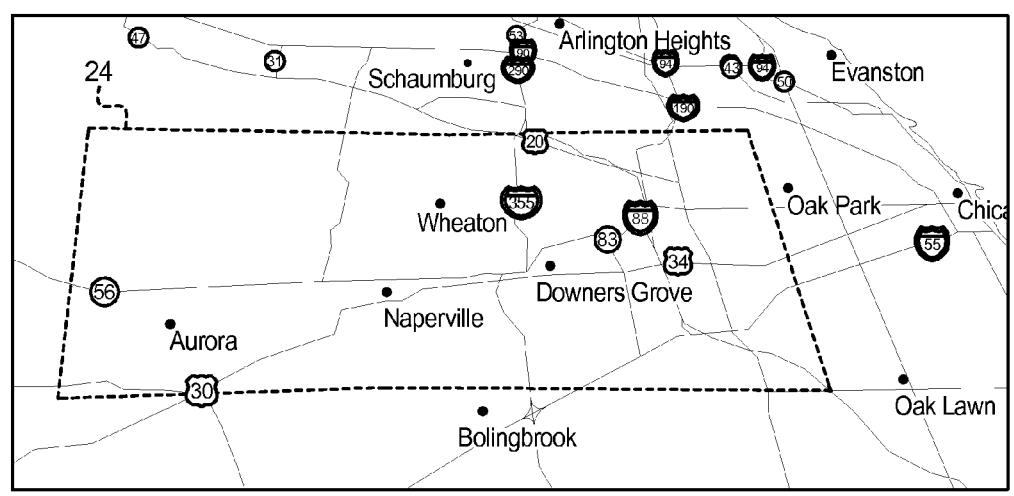
Figure 4C:
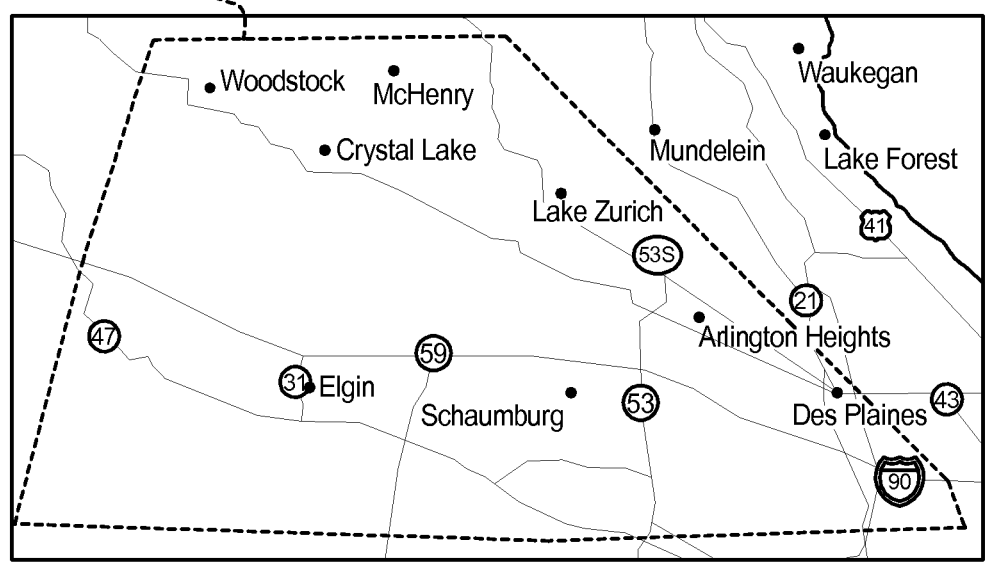
Figure 4D:
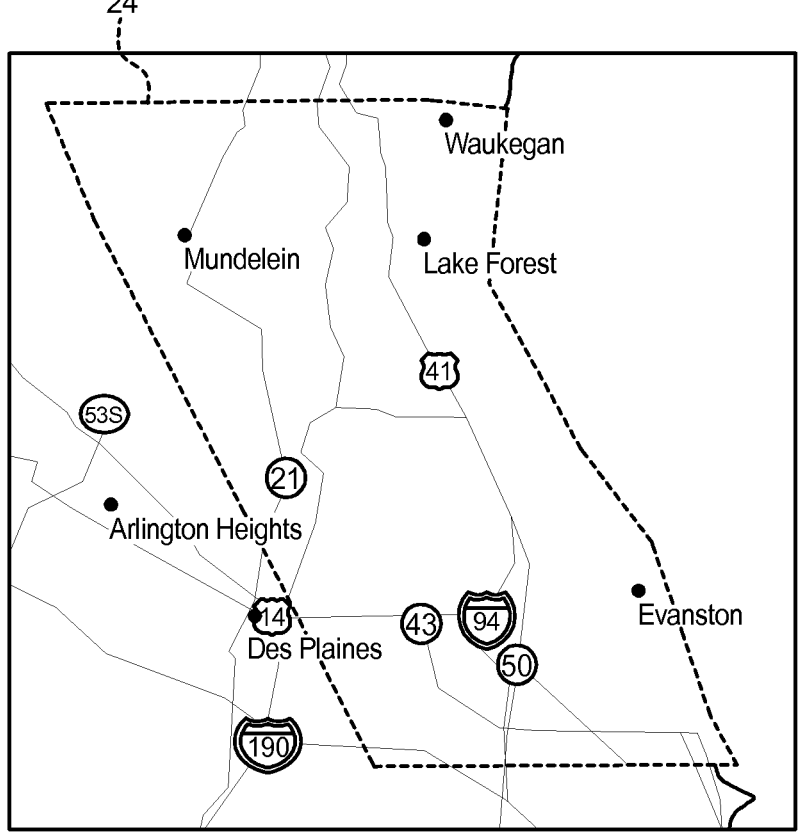
Figure 4E:
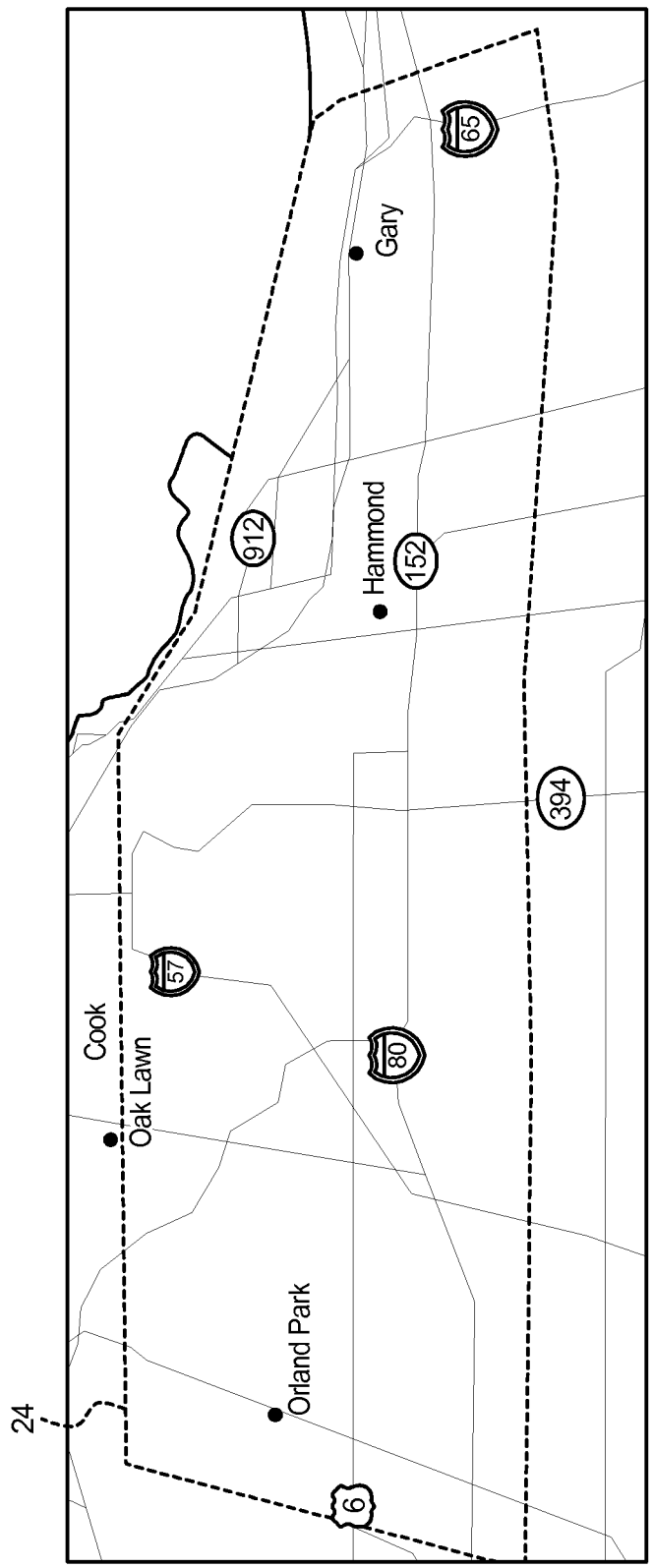

As shown in FIG. 3, the mobile device 20 may include a processor 104, a user input-output subsystem 15 that may include a user interface 16 (such as a touch screen), a communication subsystem 17, a location services subsystem 21, and a media output subsystem 23 controlled by the controller 12. The user input subsystem 15 may include a touch screen, keypad, or any other suitable mechanism of receiving user input. The mobile device 20 is described in greater details below with respect to FIG. 3.

For example, in response to executing the program instructions, the media server 11, via the controller 12, is configured to receive, via the user input-output subsystem 15, a user command to receive a contextually relevant media stream 28 from the media server 11.

The controller 12 is further configured to receive, via the location services subsystem 21, a current location 50 of the mobile device 20. The location services subsystem 21 within the mobile device 20 may include a positioning sensor such as a GPS receiver, WiFi positioning system, a radio signal multilateration subsystem, and/or any other suitable location mechanism.

The location services subsystem 21 includes a locating device 22 (e.g., GPS, cellular triangulation methods, etc.) configured to locate the current position of the listener. The precise location may not be necessary, it is believed that in some circumstances the advantages described herein may be accomplished knowing the listener's location within 1-5 km. In other circumstances, the advantages described herein may be accomplished knowing the listener's location within a much narrower range, such as within approximately 10 m.

For example, when in use by a listener, the location services subsystem 21 determines a current location 50 associated with the mobile device 20. In an example, the location services subsystem 21 or the controller 12 may determine a region 24 that the current location 50 of the mobile device 20 is currently located. The controller 12 receives the current location 50 of the mobile device and accesses the database 18 to retrieve and assemble one or more media content segments 26 associated with the current location 50 of the listener.

The controller 12 delivers, via the communication subsystem 17, a contextually relevant media stream 28 to the media output system 23 of the mobile device 20. In an example, the media output system 23 includes audio output, video output, speakers, and video display, among others. In addition, the media output system 23 may be coupled to a microphone to facilitate voice-enabled functions, such as voice recognition, voice replication, digital recording, and telephony functions.

Each media content segment 26 may be associated to a plurality of regions 24. These regions 24 can vary from global, national, local, to hyper local regions 24 within a metro area. Each region 24 may be composed of smaller regions. For example, a state region may be composed of multiple sub-regions represent various local areas and cities. Likewise, a metropolitan area may be composed of neighborhood or sub-division sub-regions.

Regions 24 may be comprised of sub-regions that are disjointed, i.e., not overlapping. In one example, a region may be composed of a plurality of geographies that are non-contiguous yet all a part of a single region 24. In another example, sub-regions related to school districts may be separated at the boundaries of the districts and therefore not overlap. Regions 24 may also be comprised of sub-regions that do overlap. For example, sub-regions related to the popularity of various local sports teams may overlap. Content types may have associated regional representations that reflect the variation in interest in the content from place-to-place.

The system 10 may be used to select geographic regions 24 for each media content segment 26, assign the media content segment 26 to one or more regions 24, create regional media content segments 26, and deliver the media content segments 26 to a mobile device 20 associated with the listener based on the listener's current location 50.

In an example, the present system 10 is configured to deliver a customized traffic report media content segment 26 to a mobile device 20. The system 10 include creation of geographical regions 24 relevant for specialized traffic audio stories 26, assigning and mapping roads and public transportation (as well as rail and water lines) to those regions 24, creating audio stories 24 for each of region 24, and delivering customized audio stories 26 to listeners, based on the location of the listener's mobile device 20.

As shown in FIG. 3, the mobile device 20 may include a device memory 102, one or more data processors 104, image processors and/or central processors 104, and a peripherals interface 106. Although the example shown in FIG. 3 is easily understood to embody a smartphone embodiment, the hardware illustrated in FIG. 3 may be embodied in various mobile devices, including tablet computer, in-dash media receivers, etc. The memory interface 102, the one or more processors 104 and/or the peripherals interface 106 can be separate components or can be integrated in one or more integrated circuits. The various components in the mobile device 20 can be coupled by one or more communication buses or signal lines, as will be recognized by those skilled in the art.

Communication functions can be facilitated through one or more communication subsystems 17 (preferably a wireless communication subsystem), which can include radio frequency receivers and transmitters and/or optical (e.g., infrared) receivers and transmitters. The specific design and implementation of the communication subsystem 17 can depend on the communication network(s) over which the mobile device 20 is intended to operate. For example, the mobile device 20 can include communication subsystems 17 designed to operate over a GSM network, a GPRS network, an EDGE network, a Wi-Fi or WiMax network, and a Bluetooth™ network. In particular, the wireless communication subsystems 17 may include hosting protocols such that the mobile device 20 may be configured as a base station for other wireless devices.

The user input-output subsystem 15 can include a touch screen controller and/or other input controller(s). The touch-screen controller can be coupled to a touch screen 16. The touch screen 16 and touch screen controller can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 16. The other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of the speaker and/or the microphone.

The memory interface 102 can be coupled to memory 108. The memory 108 can include high-speed random access memory and/or non-volatile memory, such as one or more magnetic disk storage devices, one or more optical storage devices, and/or flash memory (e.g., NAND, NOR). The memory 108 can store operating system instructions 140, such as Darwin, RTXC, LINUX, UNIX, OS X, iOS, WINDOWS, or an embedded operating system such as VxWorks. The operating system instructions may include instructions for handling basic system services and for performing hardware dependent tasks. In some implementations, the operating system instructions can be a kernel (e.g., UNIX kernel).

The memory 108 may also store communication instructions to facilitate communicating with one or more additional devices, one or more computers and/or one or more servers, such as the media server 11. The memory 108 may include graphical user interface instructions to facilitate graphic user interface processing; sensor processing instructions to facilitate sensor-related processing and functions; phone instructions to facilitate phone-related processes and functions; electronic messaging instructions to facilitate electronic-messaging related processes and functions; web browsing instructions to facilitate web browsing-related processes and functions; media processing instructions to facilitate media processing-related processes and functions; GPS/Navigation instructions to facilitate GPS and navigation-related processes and instructions; camera instructions to facilitate camera-related processes and functions; and/or other software instructions to facilitate other processes and functions (e.g., access control management functions, etc.). The memory 14 may also store other software instructions (not shown) controlling other processes and functions of the mobile device 20 as will be recognized by those skilled in the art. In some implementations, the media processing instructions are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 14.

As described above, the system 10 may be configured to create a plurality of regions 24 for a given metro area. The regions 24 may be defined based on local knowledge and the relevance of these regions 24 in that metro area. The selection of regions 24 may be derived directly from crowd-sourced data received from listeners. The regions 24 are chosen such a way that the regions 24 are not too large to be irrelevant and not too small to be an overwhelming effort for content creation. Once the regions 24 are defined, a geo-spatial polygon is created using a standard mapping tool. A region 24 may be defined as one contiguous polygon 25 or as a collection of multiple disjoint, smaller polygons 25. A region 24 may be defined as being composed of multiple sub-regions. For example, the Chicago metro area may be divided into 5 different regions 24: Chicago City, North, South and Southeast, Northwest and West, as shown in FIGS. 4A-4E.

In an example, listeners may provide a commuting route 30 to the media server 11 via the communication subsystem 17. The media server 11 may receive the commuting route 30 from multiple listeners and, through the use of statistical analysis and/or one or more machine learning algorithms, the media server 11 can derive relevant geographic regions 24 (as well as related roads and public transit) based on the listener data. The controller 12 may then create and deliver the appropriate traffic report media content segment 26 to match the derived geographic regions 24, direction of travel, time of day, etc.

In an example, transportation channels 32, such as roads, rail, bus, and water line transportation services, are identified and assigned to the respective regions 24 each individual transportation channel 32 is located. Based on the location of the regions 24 and the relevance of the transportation channels 32, these services can be assigned to specific direction of interest for different regions 24. For example, listeners in the suburbs of Chicago are more concerned about the travel times to the city and are less concerned about the travel times from the city. Similarly, the listeners in the north suburbs are more concerned about the road and rail network in the north and northwest suburbs compared to the south and west suburbs. Because each direction of each transportation channel 32 is mapped, the system 10 may provide both inbound and outbound information to listeners.

In addition to traffic, a variety of content may be regional specific. For example, the regions 24 may be mapped according to different local news regions 24 defining a metropolitan area and nearby areas. As a specific example, the local news region 24 of Chicago may include Illinois, and parts of Indiana, Michigan, and Missouri. As another example, national news content may include regions 24 defining the fifty U.S. states, Puerto Rico, and other U.S. territories.

As yet another example, weather regions 24 may include regions 24 defined based on specific weather conditions, such a regions 24 impacted by a particular storm or weather front. Changing weather conditions may result in the realignment of given weather regions 24 to map as an area expected to be affected by a given weather event. This is a good example of how the regions 24 may be either dynamic or static. Likewise, it is contemplated that regions 24 may be defined for events, political news, business news, technology, arts and entertainment, cultural news, etc., again, statically or dynamically.

Figure 5:
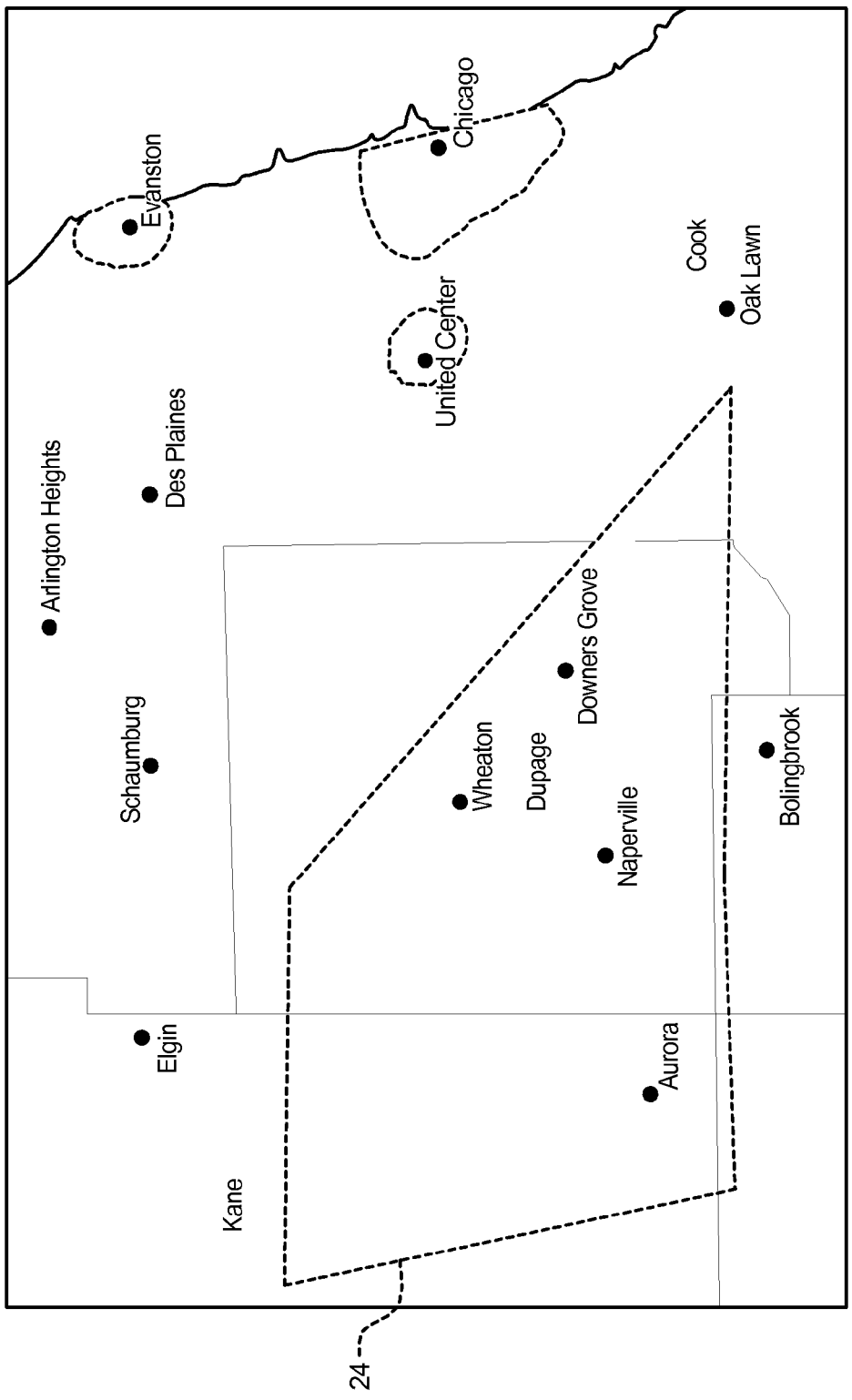
FIG. 5 is a graphical top view of an example of a disjointed region.
Figure 6:
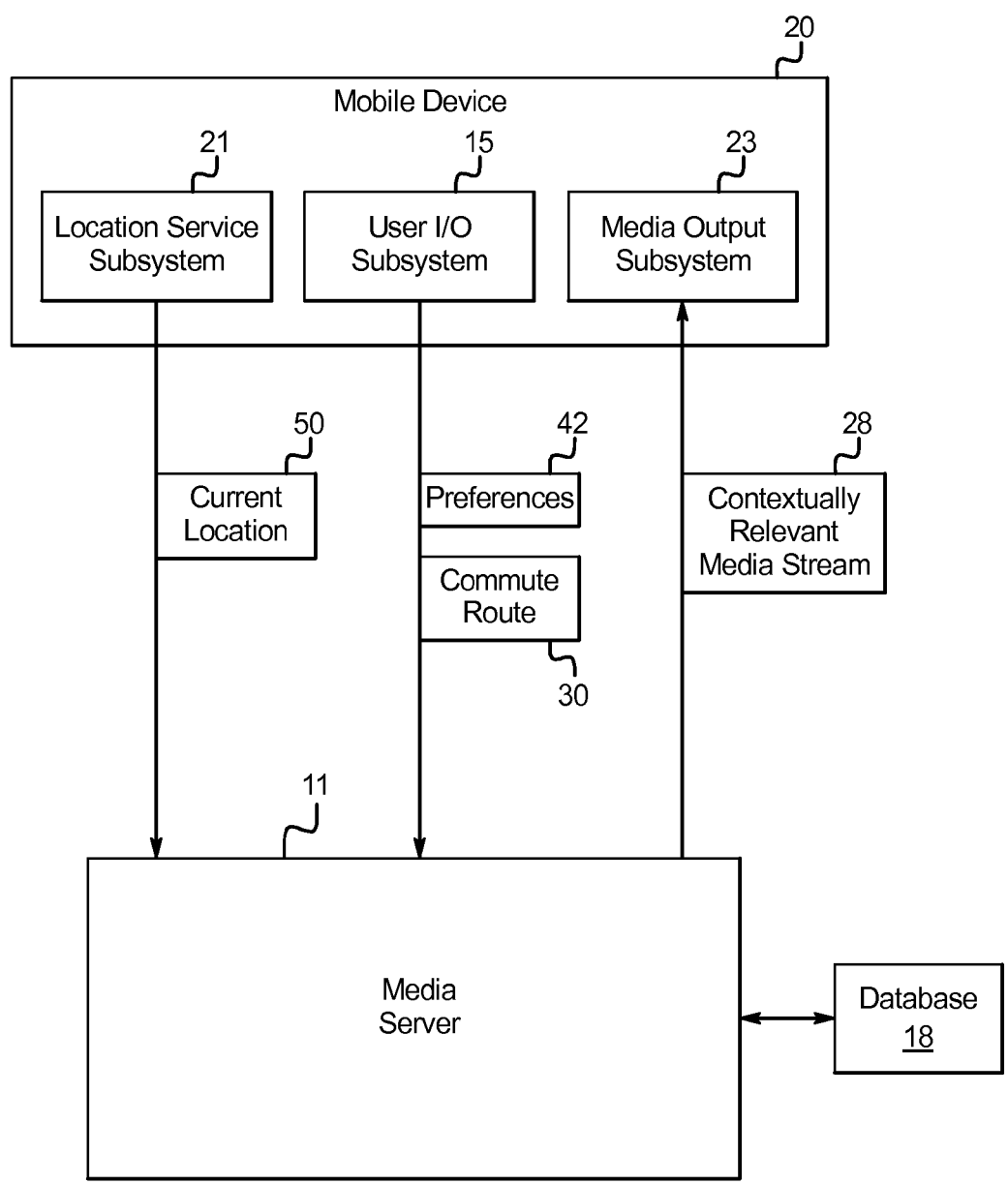
FIG. 6 is a flow chart representing a method of combining selected media content segments to provide a contextually relevant stream of media content based on geographic regions relevant to the user, the location of the user, temporal triggers, and additional user preferences.

Once the regions 24 are defined, a multi-layered hierarchical map may be used to filter different news content. As an example, a political map may select Russian politics news to be delivered to a Russian political region that covers disjoint neighborhoods in different cities. In other words, the regions do not necessarily cover adjacent geographical areas. Instead, the region may cover a plurality of disjointed sub-regions, as shown in FIG. 5.

As another example, an event map may define specific points of interest that may be associated for listeners in an area. For example, places in Chicago such as the United Center, the Rosemont Horizon, Navy Pier, McCormick Place, Lyric Opera Theater, and the All State arena can all be associated for event news for Chicago listeners. Similarly, places in the northwestern Chicago suburbs such as the Sears Theater, Milwaukee Museum, All State area, Schaumburg convention center, and the Rosemont Horizon can all be associated for event news for Northwest suburb listeners. As a further example, a school district map may be defined for various school district regions to deliver school news to households in that region. Additionally, regional maps, such as Chicago and neighborhood area listeners may be defined while the broader Illinois residents may be placed in a non-Chicago news region.

In an example, once the regions 24 are defined and the various transportation channels 32 are mapped to the regions 24, media content may be received from media sources, wherein the streaming media content includes media that describes the traffic, news, sports, events, among other content in each of the regions 24 in a meaningful way. The streaming media content may be received from any suitable media source including audio media sources and video media sources and each media content segment 26 may be stored in the database 18.

In an example, the present system 10 may operate by permitting the media source to define various content tags 38 and/or location tags 36 for each media content segment 26. In another example, the system 10 may be configured to assign content tags 38 and/or location tags 36 to the received media content segments 26 based on the content of the media content segment 26. The content tags 38 may then be selected by the controller 12 for inclusion in a contextually relevant media stream 28 and delivered to the mobile device 20 via the communication subsystem 17, wherein the contextually relevant media stream 28 is based on the preferences of the listener and/or the location of the listener.

In addition, the content tag 38 may indicate whether the subject matter of the media content segment 26 is kid-friendly. For example, the media content segment 26 may include metadata including key words and/or content tags 38 that may describe the subject matter of the media content segment 26. The system 10 may filter the media content segments 26 such that the delivered media content segments 26 are free from mature subject matter. For example, the content tags 38 may indicate that a media content segment 26 may include violence, adult situations, drug use, foul language, among others. The content tags 38 may also include an age appropriate indication. For example, the content tags 38 may indicate the subject matter is or is not suitable for children over 5 years old, for children over 10 years old, for children over 15 years old, among others.

Each media content segment 26 may be assigned to specific regions 24 using metadata for each story. For example, each media content segment 26 may be associated with a location tag 36 and/or topic tag 38 and stored in the database 18. The tags correspond with categorized metadata (i.e., keywords) from which the system 10 may search and provide the relevant media content segment 26 to each specific listener.

For example, the traffic report media content segment 26 may include metadata related to directional relevance for each of the transportation channels 32 for specific regions 24. For example, the traffic media content segment 26 for northern region 24 may include metadata related to inbound traffic to Chicago. The metadata may be related to travel times to O'Hare even though it may be outside the region 24 and describe travel times to the intersection I-294 to the Kennedy expressway.

In addition, the metadata may include a timestamp such as a temporal relevance tag 40 indicating the time that the media content segment 26 was recorded. The metadata of time sensitive media content segment 26 may include a content tag 38 indicating the type of media content segment 26, such as traffic media, weather media, accident report media, etc. The system 10 may then limit the delivery of particular media content segment 26 to certain time period after the media content segment 26 was recorded based on the temporal relevance tag 40. For example, traffic reports may be limited to playback only during the twenty-minute window after the traffic report media content segment 26 was recorded.

In yet another example, a weather media content segment 26 may include a one-hour temporal relevance tag 40 such that the system 10 will discontinue its delivery to a mobile device 20 one-hour after the weather media content segment 26 was recorded. Additionally, some audio stories 26 may need to be delayed before being delivered to a mobile device 20, thus, the metadata may also include a temporal relevance tag 40 relating to a time to deliver the media content segment 26. In such examples, the system 10 may include an internal clock from which the temporal relevance tag 40 may be compared to the present time in order to determine whether the media content segment 26 has expired or is valid for delivery.

Further, some media content segments 26 may include tags that indicate the expiration of previous media content segments 26. For example, a news brief on a breaking media content segment 26 may be set to expire upon the availability of a more fully developed story. Such dependent expiration may be accomplished by tagging the news brief media content segment 26 with a tag that indicates to the system 10 check for a more fully developed story before playback of the news brief media content segment 26.

In order for the system 10 to determine the lifespan of a media content segment 26, a director may determine the time of validity of each story that is created. Alternatively, the audio content platform system 10 may automatically determine the length of time the media content segment 26 is valid. This determination may be made according to broader guidelines that indicate a pre-defined validity. For example, all traffic media content segments 26 may be made valid only for 20 minutes after they are created. However, other news media content segments 26 may be made valid for longer time depending on what else happens on that topic. The system 10 may include software tools and processes to let assign or override the validity of each media content segment 26. For example, if a media content segment 26 initially includes a 1-hour expiration, but is replaced before the end of the hour, the system 10 may override the 1-hour expiration and cause the media content segment 26 to expire immediately.

During playback, the system 10 may make use of the current validity of the stories in creating a contextually relevant media stream 28 that uses the latest valid stories. It is contemplated that, if the listener chooses, all the media content segments 26, even if they are no longer valid, may be searched and added to the customized contextually relevant media stream 28 by the listeners.

The media server 11 may store listener preferences 42 in the database 18, such as particular topics or content that the listener is interested in. The system 10 may select media content segments 26 associated with content tags 38 that match the preferences of the listener, and deliver such media content segments 26 to the mobile device 14 associated with the listener. For example, if the listener preference is for news and sports, the system 10 delivers audio stories 26 associated with content tags 38 that indicate sports and news audio stories 26.

The media server 11 may receive, via the communication subsystem 17, listener preferences 42 through the user interface 16 associated with the mobile device 20. The media server 11 may present various categories for the listener to choose from in order to determine which media content segments 26 should be included in the listener's contextually relevant media stream 28. For example, the categories may include news, government, politics, business, weather, traffic, sports, among others. Sub-categories may include individual sports teams, types of news, regions of government, etc.

For example, the listener may indicate which categories and sub-categories of audio content the listener is interested in. The listener may indicate by selecting a box adjacent to the various categories and sub-categories that the listener is interested in. In some embodiments, the listener may rank the categories to indicate priority and/or order of the media content segments 26 within the contextually relevant media stream 28. In other words, the listener preference 42 may include an order of priority with respect to other media content segments 26 (e.g., the current relevant traffic audio story 28 may be programmed to play first, then the local sports news story 26 may play, followed by the local weather news audio story 26, etc.).

Listener preferences 42 may include a time of day that the listener would like to hear a selected category of media content segments 26. The listener may indicate that he or she would like to hear the category at more than one time, for example, both in the morning and evening. The listener may also select the exact time or time intervals to hear the selected category.

The listener preference 42 may include a kid-friendly mode. For example, when the listener selects the kid-friendly mode, the media content segments 26 delivered to the mobile device 20 are those having content tags 38 that indicate kid-friendly subject matter. Similarly, the listener preference 42 may include a specific age of a child, such that the system 10 only delivers media content segments 26 having content tags 38 indicating the subject matter is suitable for children over a certain age. The listener preference 42 may also include an adult mode wherein media content segments 26 having content tags 38 indicating children subject matter is excluded from the contextually relevant media stream 28. A listener preference 42 may be used to indicate when media content segments 26 that would have been screened by a kid-friendly mode may be played without screening. For example, a listener preference 42 may indicate that when the listener is both: (1) traveling eastbound on I-90; and (2) the time is between 8 am-9 am (the combination relating to the listener's morning commute to work), there should be no content filter on the media content segments 26. This is merely one example of a multi-dimensional filter. It will be recognized by those skilled in the art that the various listener preferences 42 and data collected by the mobile device 20 may be used in combination to implement complex multi-dimensional filters.

The content segments 26 delivered to the mobile device 20 in the contextually relevant media stream 28 may be selected in a priority order dictated by a complex set of multi-dimensional variables. For example, combinations of the day of the week, the time of day, the weather conditions, the direction of travel (if in a moving vehicle), etc. may dictate that when the listener turns on the application, which of the content segments 26 are delivered to the mobile device 20 in the contextually relevant media stream 28. During commuting times, the traffic may be first. During the time in the morning the listener is getting ready to leave the house, the weather may be first. In the evening, the business news may be first. These are simple examples to illustrate the point, it is understood that the multi-dimensional variable analysis can be used to generate highly complex and highly customized contextually relevant media streams 28 for each user.

In addition, the media server 11 may track the listening habits of the listener to customize preferences for certain time periods. For example, if a listener listens during her commute and thus tends to have a morning listening period and an afternoon listening period, the media server 11 may permit the listener to specify different preferences for the morning period and the evening period. Since listener's behavior is likely to vary from day-to-day, the system 10 may include a predictive model to predict the listener's likely preferences given the listener's indicated preferences 42 and past behavior. The predictive model may also incorporate location information to further refine the system 10 model of the behavior of the listener. Moreover, the system may track the listener's listing behavior, such as skips, fast-forwards, selections of media content segments 26 to listen to immediately, etc., to determine a time-based listening profile based on categories listened to at various times of day.

In another example, based on the listener's location of his or her listening device 20, the system 10 may select media content segments 26 associated with a location tag 36 that matches the location of the listener. It is also contemplated that the listener may be search and add media content segments 26 to the contextually relevant media stream 28 by the listeners.

In addition, the listener may select a listener preference 42 may include a preferred time of day to hear certain media content segments 26. For example, a listener may prefer business media content segments 26 in the morning on the way to work, but sports media content segments 26 in the evening on the way home from work.

In yet another example, if the listener begins his or her commute at 5 p.m., the listener may indicate a time preference at 5 p.m. to receive a traffic media content segments 26 that is relevant to a listener commuting route 30. For example, the listener may input his or her commuting route 30 into the system 10 such that the system may return traffic media content segments 26 associated with location tags 36 that match the regions 24 associated with the commuting route 30.

Alternatively, the predefined time preference may be when the listener (indicated by the location of the listener device 20) reaches a predefined location. For example, through the user interface 16, a listener may indicate that he or she would like to receive the current traffic media content segments 26 when the listener device 20 passes a certain geographic position. For example, the system may deliver the media content segments 26 when the listener reaches the preselected location preference (or time preference, etc.) by simply triggering the system 10 based on a marker (e.g., geographic marker, time market, etc.) through the interface 16 as the listener reaches the location, time, or similar marker.

This may be beneficial if the listener knows that he or she will need to make a decision as to which route to take on a commute at a certain location. The system 10 is configured to deliver the current traffic media content segments 26 automatically to the listener at the precise time necessary to make the decision. For example, the listener device 20 may receive a two minute long traffic media content segments 26 at a location approximately three minutes ahead of the decision point in the commute or receiving the traffic media content segments 26 precisely at the time the listener begins the daily commute.

In response to the media server 11 receiving the current location 50 of the mobile device 20, the controller 12 is configured to create and deliver, via the communication subsystem 17, a contextually relevant media stream 28. The contextually relevant media stream 28 includes one or more media content segments 26, wherein the selected media content segments 26 are selected based on the current location 50 of the mobile device 20. The selected media content segment 26 may include regional specific news, regional specific weather, regional specific sports news, and regional specific traffic information.

With respect to traffic audio stories 26, once the media content segments 26 for traffic reports are generated for each of these regions 24, the system 10 may automatically indicate to the mobile devices 20 in the various regions 24 that the time sensitive traffic media content segment 26 are available for that region 24. The location device 22 within the mobile device 20 indicates the region that the mobile device 20 is located and delivers the traffic media content segment 26 of that region 24 to the mobile device 20 as the next media content segment 26.

In alternative embodiments, the listener may indicate a delivery preference (through listener controls provided through the user interface 16 on the mobile device 20) for when the traffic media content segments 26 are to be delivered. For example, the predefined time may be when the listener (indicated by the location of the mobile device 20) reaches a predefined location. The delivery preference may include an order of priority with respect to other media content segments 26 (e.g., play the traffic media content segment 28 may be programmed first, then play local sports news media content segment 26, followed by the local weather news media content segment 26, etc.).

For example, through the user interface 16, a listener may indicate that he or she would like to receive the current traffic media content segment 26 when the mobile device 20 passes a certain geographic position. This may be beneficial if the listener knows that he or she will need to make a decision as to which route to take on a commute at a certain location. The system 10 is configured to deliver the current traffic media content segment 26 automatically to the listener at the precise time necessary to make the decision. For example, the mobile device 20 may receive a two minute long traffic media content segment 26 at a location approximately three minutes ahead of the decision point in the commute or receiving the traffic media content segment 26 precisely at the time the listener begins the daily commute.

In one contemplated embodiment, the listener interface 16 accepts a listener selection of a listener preference (e.g., location, time, etc.) at which a traffic media content segment 26 is to be played anytime the listener reaches the preselected location preference (or time preference, etc.) by simply triggering the system 10 based on a marker (e.g., geographic marker, time market, etc.) through the interface 16 as the listener reaches the location, time, or similar marker.

It should be noted that various changes and modifications to the presently preferred embodiments described herein will be apparent to those skilled in the art. Such changes and modifications may be made without departing from the spirit and scope of the present invention and without diminishing its attendant advantages.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:

1. A system for delivering contextually relevant streaming media content embodied in a mobile device comprising:
   a controller;
   a user input-output subsystem;
   a communication subsystem;
   a location subsystem controlled by the controller;
   a media output subsystem controlled by the controller;
   a memory coupled to the controller, wherein the memory is configured to store program instructions executable by the controller;
   wherein in response to executing the program instructions, the controller is configured to:
      receive, via the user input-output subsystem, a user command corresponding to least one listener preference;
      receive, via the location subsystem, a current location of the mobile device;
      provide, via the communication subsystem, the current location of the mobile device to the media server; and
      in response to providing the current location of the mobile device to the media server, receive, via the communication subsystem, a contextually relevant media stream, wherein the contextually relevant media stream includes one or more media content segments selected from a plurality of media content segments based on the current location of the mobile device and the at least one listener preference.

2. The system of claim 1 wherein the selected media content segment includes traffic information.

3. The system of claim 1 wherein the selected media content segment includes regional specific news.

4. The system of claim 1 wherein the selected media content segment includes regional sports news.

5. The system of claim 1 wherein the selection of the media content segment is further based on a temporal relevance tag associated with the media content segment, wherein the temporal relevance tag indicates an expiration time associated with the selected media content segment.

6. The system of claim 1 wherein the at least one listener preference includes a content selection associated with traffic media content.

7. The system of claim 1 wherein the at least one listener preference includes a content selection associated with news media content.

8. The system of claim 1 wherein the at least one listener preference includes a content selection associated with sports media content.

9. The system of claim 1 wherein the at least one listener preference includes a content selection associated with weather media content.

10. The system of claim 1 wherein the listener preference includes at least one content selection, wherein the plurality of media content segments are stored in a database, wherein the database includes a location tag and a content tag associated with each of the plurality of media content segments, wherein the contextually relevant media stream includes one or more media content segments associated with the location tag that matches the current location of the mobile device, wherein the contextually relevant media stream includes one or more media content segments associated with the content tag that matches the at least one content selection.

11. The system of claim 1 wherein the at least one listener preference includes a content selection and a time selection, wherein the controller is configured to deliver the contextually relevant media stream at a time that matches the time selection, wherein the contextually relevant media stream includes one or more media content segments associated with the content tag that matches the at least one content selection.

* * * * *